(No Model.)
J. A. LAWRENCE.
AUTOMATIC DUST VALVE OR SHIELD FOR COUPLINGS OF AIR BRAKES.
No. 575,252. Patented Jan. 12, 1897.
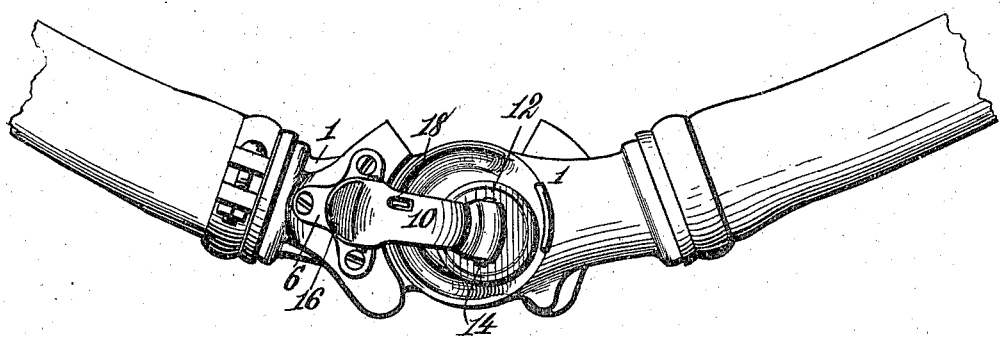
Fig. 1.
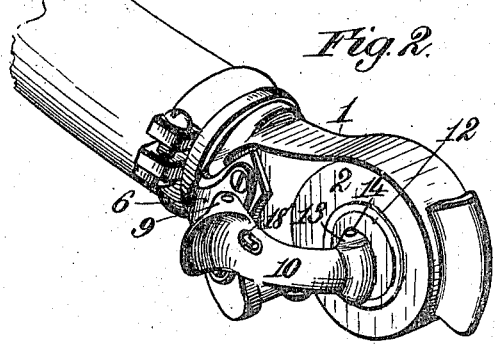
Fig. 2.
Fig. 3.
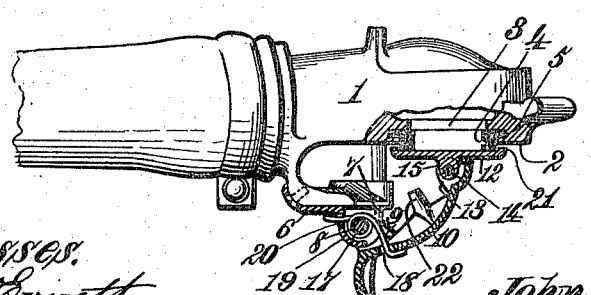
Witnesses.
Robert Everett.
Thos. A. Gunn
Inventor.
John A. Lawrence.
By James L. Norris.
Atty.

UNITED STATES PATENT OFFICE.

JOHN A. LAWRENCE, OF COLUMBUS, OHIO.

AUTOMATIC DUST VALVE OR SHIELD FOR COUPLINGS OF AIR-BRAKES.

SPECIFICATION forming part of Letters Patent No. 575,252, dated January 12, 1897.

Application filed September 23, 1896. Serial No. 606,744. (No model.)

*To all whom it may concern:*

Be it known that I, JOHN A. LAWRENCE, a citizen of the United States, residing at Columbus, in the county of Franklin and State of Ohio, have invented new and useful Improvements in Automatic Dust Valves or Shields for the Couplings of Air-Brake Pipes, of which the following is a specification.

It is the purpose of my invention to provide an automatic dust valve or shield for the couplings of air-brake pipes.

My improvements are directed particularly toward securing a perfect seating of the dust-valve under all circumstances and the prevention of any tendency to assume a position which might cause the edge of said valve to partly enter the opening in the coupling and thereby prevent it from seating and closing said opening.

It is a further purpose of my invention to protect the springs which operate the dust-valves from exposure to wet when the brake-pipe couplings are separated, thereby prolonging their term of service and preserving their elasticity unimpaired and enabling them to seat the dust-valves upon the air-openings with the proper degree of accuracy and force.

My invention consists to these ends in the novel features of construction and new combination of parts hereinafter fully described, and then particularly pointed out in the claims which conclude this specification.

For the purposes of the following description reference will be had to the accompanying drawings, in which—

Figure 1 is a side elevation of two brake-pipe couplings connected together and provided with my invention, showing the position of the same when the pipes are coupled together. Fig. 2 is a similar elevation showing one of said couplings disconnected with the dust-valve in its closed position. Fig. 3 is a section taken in the axial line of the brake-pipe and passing through the dust-valve and valve-lever.

The reference-numerals 1 1 in said drawings indicate the two parts of the ordinary coupling, which are of the usual construction. Each half-coupling has a flat face 2 lying in a plane parallel with the longitudinal axial line of the brake-pipe. In this face is the opening 3 for the passage of air, surrounded by a gasket 4 of india-rubber or other suitable material and arranged in a counter-bored seat 5 around said opening 3 with its edge rising somewhat above the face 3.

Upon each coupling-head I mount a bracket 6, having lugs 7, which support a pintle or fulcrum 8, the ends of which project beyond the outer faces of the lugs and receive ears 9, which form part of a lever 10. From its pivotal point or fulcrum 8 said lever extends with a gentle curvature to a point directly over the opening 3, where its end is provided with a valve plate or shield 12 of such size and form as to wholly cover the opening. This plate or shield is pivotally attached to the ends of the lever 10 by means of ears 13 on the latter, which receive the ends of a pivot 14, the latter having connection with lugs 15 rising from the top of the valve-plate and lying substantially in the diametrical line of said valve-plate.

Upon the other side of the fulcrum 8 the lever 10 is extended sufficiently to form an operating-terminal 16, which is bent or formed at such an angle to the remaining portion of the lever that when the valve-plate 12 is seated over the opening 3 the terminal 16 will stand at, or nearly at, a right angle with the pipe, in which position it can easily be raised by the thumb or one finger when the coupling-heads are connected.

The valve is normally operated to seat over the opening 3 by a spring 17, which is coiled upon the pivot or fulcrum 8, one end being inserted in an opening 18 in the lever between the fulcrum and the valve-plate. The spring is partly inclosed by a housing 19, which is integral with the lugs 7 and bracket 6, being curved in the lines of the edges of the lugs until it passes over or nearly over their ends and beneath the lever, which is of such width as to cover said lugs and the space between them. This construction affords a much-needed protection to the spring, especially when the coupling-heads are separated and hanging. The constant exposure to wet, which is retained for a considerable time by the coils of the spring, together with the oxidation of the atmosphere, soon causes the spring to deteriorate so rapidly that it either loses its elasticity or snaps, thereby making it necessary to apply a new one. By my invention sufficient protection is given to prevent this injury.

One end of the spring may be held by a small opening 20 in the housing 19 close to the bracket, and a single drop of solder may, if necessary, be applied to close the opening and hold the wire securely.

The valve-plate 12 has a flat seating-face, preferably surrounded by a narrow flange 21, which surrounds the projecting end of the rubber gasket 4. The plate is pivoted, as described, in order that it may seat uniformly upon every part of the edge of the gasket, which is practically impossible in using a valve-plate that is rigid with the lever. To limit the play of the valve-plate upon its pivot or fulcrum, I form or mount a stop 22 upon the lever on the side next to the coupling-head in such position that the valve-plate will engage it in case said plate should be turned. The point of engagement is such that the valve-plate cannot assume such position that its edge would in closing cross the opening 3 at any point, whereby it might be incapable of seating until it was raised and turned. The stop 22 permits all necessary play, but arrests the plate when turned to such an angle that its edge closely approaches the opening 3. As long as its edge can strike the surface 2 or the edge of the gasket 4 it will readily find its seat and will tightly close the opening 3 under all possible conditions of wear, whereas if the valve-plate was rigidly mounted on the lever the slightest displacement of the gasket or wear of the valve-face would cause it to seat imperfectly and close the opening upon one side only. Moreover, by pivotally connecting the valve-plate to the end of the lever a new plate can be substituted at any time without removing the other parts, whereas in a lever having a valve integral with it any injury to either of said parts will necessitate the sacrifice of both.

What I claim is—

1. In an air-brake coupling, the combination with a coupler-head, of a spring-actuated lever and a valve-plate pivotally mounted on the end of the lever and adapted to seat upon the air-opening, substantially as described.

2. In an air-brake coupling, the combination with a coupler-head, of a spring-actuated lever, a valve-plate pivotally connected to the end of said lever, the latter being provided with a stop to limit the play of the valve-plate upon its pivot, substantially as described.

3. In an air-brake coupling, the combination with a coupler-head, of a lever fulcrumed thereon, a valve-plate pivoted on the end of said lever, a spring coiled on said fulcrum to actuate the lever, and a housing partly inclosing said spring, substantially as described.

4. In an air-brake coupling, the combination with a coupling-head, of a lever pivoted upon a detachable bracket, a spring coiled on the pivot and partly inclosed by a housing on the bracket, and a valve-plate pivoted on the end of the lever to close the air-opening, the lever being provided on its inner face with a stop to limit the play of the valve-plate, substantially as described.

In testimony whereof I have hereunto set my hand in presence of two subscribing witnesses.

JOHN A. LAWRENCE.

Witnesses:
WILLIAM D. KAIL,
PARKER W. PHENEGER.